United States Patent
Doerner et al.

(10) Patent No.: US 10,552,640 B2
(45) Date of Patent: Feb. 4, 2020

(54) IN-SITU DATA VERIFICATION FOR THE CLOUD

(71) Applicant: Quantum Corporation, San Jose, CA (US)

(72) Inventors: Don Doerner, San Jose, CA (US); Gregory L. Wade, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 303 days.

(21) Appl. No.: 15/632,584

(22) Filed: Jun. 26, 2017

(65) Prior Publication Data

US 2018/0260583 A1    Sep. 13, 2018

Related U.S. Application Data

(60) Provisional application No. 62/468,589, filed on Mar. 8, 2017.

(51) Int. Cl.

| | |
|---|---|
| *G06F 21/00* | (2013.01) |
| *G06F 21/64* | (2013.01) |
| *G06F 21/60* | (2013.01) |
| *H04L 9/06* | (2006.01) |
| *H04L 29/08* | (2006.01) |

(52) U.S. Cl.
CPC ............ *G06F 21/64* (2013.01); *G06F 21/60* (2013.01); *G06F 21/602* (2013.01); *G06F 21/645* (2013.01); *H04L 9/0662* (2013.01); *H04L 67/1097* (2013.01)

(58) Field of Classification Search
CPC ........ G06F 21/60; G06F 21/64; G06F 21/645; G06F 21/602; H04L 63/12; H04L 63/123; H04L 9/32; H04L 9/3236; H04L 9/3239; H04L 9/3242
See application file for complete search history.

(56) References Cited

U.S. PATENT DOCUMENTS

| | | | |
|---|---|---|---|
| 2010/0080391 A1* | 4/2010 | Shah ....................... | G06F 21/64 380/277 |
| 2014/0149794 A1* | 5/2014 | Shetty ................. | H04L 67/1095 714/20 |

* cited by examiner

*Primary Examiner* — Edward Zee
(74) *Attorney, Agent, or Firm* — Eschweiler & Potashnik, LLC

(57) ABSTRACT

Example methods and apparatus asynchronously verify data stored in a cloud data storage system. One embodiment comprises a monitoring circuit that determines if a data auditing condition associated with a cloud storage system or archived data stored in the cloud storage system has been met, a metadata mirror circuit that controls a metadata mirror to provide metadata, including a first checksum, associated with the archived data to the apparatus, a checksum circuit that computes a second checksum based on the archived data, a verification circuit that generates an audit of the first checksum and the second checksum by comparing the second checksum with the first checksum, and a reporting circuit that generates a log of the audit, that provides the log to the data storage system, and that provides a notification of a data integrity failure to a user associated with the archived data.

13 Claims, 7 Drawing Sheets

IN-SITU DATA VERIFICATION FOR THE CLOUD

REFERENCE TO RELATED APPLICATION

This Application claims priority to U.S. Provisional Application No. 62/468,589 filed on Mar. 8, 2017, the contents of which are hereby incorporated by reference in their entirety.

BACKGROUND

Public cloud storage is increasingly used for data storage, archived data storage, and disaster recovery (DR). Users require high confidence in data storage and DR systems, and thus require the ability to audit data stored in the cloud, as well as data storage and DR systems and processes. Auditing archived data stored in the cloud or a DR process conventionally requires accessing and retrieving data stored in a cloud storage system to check the stored data's integrity. Cloud storage systems, while convenient, may be slower to access than local data storage systems. Many cloud storage systems bill users hourly for access to and operations performed on data stored in the cloud storage system. Thus, auditing or scrubbing data stored in a cloud storage system for DR purposes may become time consuming, may consume costly bandwidth, and may therefore be expensive.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
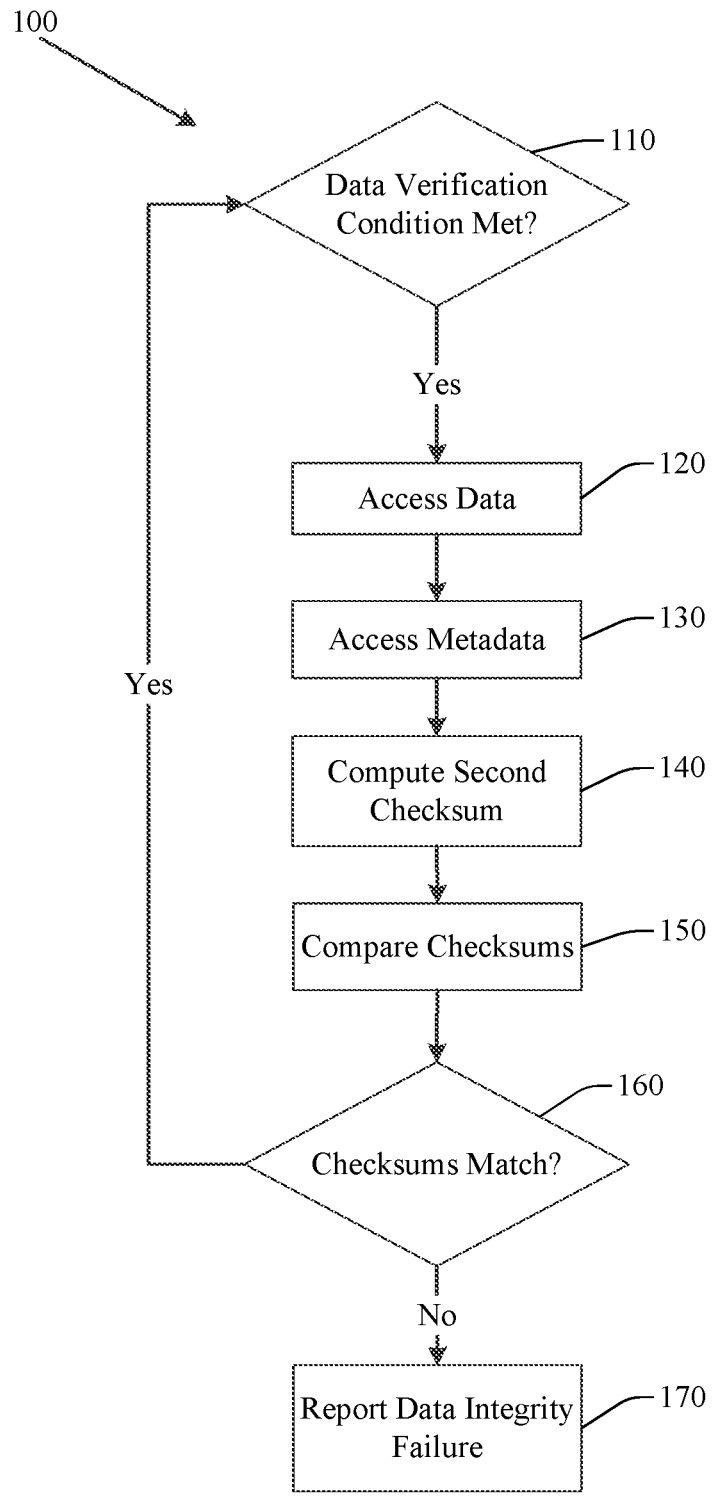
FIG. 1 illustrates an example method associated with asynchronous in-situ data verification for the cloud.

Example apparatus and methods concern asynchronous in-situ or local verification of data stored in a cloud storage system. Example methods and apparatus access a verification checksum of data stored in a cloud storage system using a process local to the cloud storage system, where the data stored in the cloud storage system has been transformed before being stored in the cloud storage system, and where the verification checksum was computed before being stored in the cloud storage system. The transformation of the data (e.g. encryption, compression, or deduplication) may have been performed on the original data at a data center distinct from the cloud storage system. The set of transformed data and the verification checksum are then replicated and transmitted to the cloud for storage. Example methods and apparatus access the verification checksum stored with metadata associated with the transformed data, and compare the verification checksum with a second checksum computed locally in the cloud from the stored transformed data, using a process local to the cloud storage system. A second checksum that agrees with the verification checksum indicates data integrity. A second checksum that does not match the verification checksum indicates a failure of data integrity. The verification checksum and metadata associated with the stored data may be stored in a metadata mirror. The process that compares the checksum and the verification checksum may be local to the metadata mirror. Example methods and apparatus may log successful data integrity verifications, and may notify the data center or a data storage system distinct from the cloud storage system of data integrity failures. Example methods and apparatus may asynchronously or spontaneously notify a user of data integrity failures using at least one notification approach or mode. Example methods and apparatus improve on conventional approaches to data verification that require transmission of the archived data to a different location for verification by shifting data verification to the cloud, reducing bandwidth requirements, time, and cost of data verification.

Data storage systems, including cloud storage systems, may store metadata mirrors of stored data. A metadata mirror may include information about the location of copies of data, as well as other metadata. The information stored in the metadata mirror may also include a checksum associated with a copy of the data associated with the metadata as stored in the cloud storage system. For example, the information stored in the metadata may include a checksum associated with data that has been subjected to various transformations, including compression, deduplication, or encryption. Compression, deduplication, or encryption may increase the complexity of auditing processes, because conventional approaches to scrubbing or auditing data may require decrypting or de-compressing stored or archived data before auditing processes may be performed. Furthermore, retrieving archived data or metadata from a cloud storage system to perform scrubbing or auditing actions at a data center is time consuming, consumes bandwidth, and is expensive. For example, while conventional public cloud storage systems may allow data to be sent to the cloud free of charge, conventional cloud storage systems include rate schedules for retrieving data from the cloud, which can create substantial costs for a user attempting to verify the integrity of data stored in the cloud. Compression, deduplication, or encryption may thus complicate the creation and maintenance of archived data or metadata mirrors. Given the time and cost required to audit data and metadata stored for DR purposes, improvements to data validation or scrubbing are sought.

In some embodiments, example methods and apparatus may be implemented as part of a file system metadata capture and restore system. Example methods and apparatus may store the verification checksum, location data, or other metadata, in a metadata mirror to further improve reliability, performance, and security compared to conventional approaches to data verification. Recall that file systems store files and store information about files. The information stored in files may be referred to as data. The information about files may be referred to as metadata. The metadata may include, for example, a file name, a file size, a file parent, a file descendant, a file access time (e.g. atime data), a file owner, file permissions, an identifier of a user that accessed the data, a file location, ctime data, mtime data, and other information. Metadata may also include a verification checksum. Some of the metadata for an individual file may be stored in a data structure known as an inode. The inodes and metadata for a file system may also be stored collectively. The metadata has both structure and content. The content (e.g., metadata) may be stored in a set of data structures (e.g., btrees). When the metadata is stored in one or more trees (e.g., btrees), there may be a root inode associated with the top of the set of trees. When the data in a file or about a file changes, a file system may want to update the metadata about that file. For example, if the contents of a file are changed or accessed the file system may want to memorialize the time at which the change or access was made and by whom the change or access was made. Example methods and apparatus may correlate the information about the change or access with information about data integrity to further the security of the data.

To protect the metadata concerning the files organized and made available by a file system the file system may include a metadata dump facility that contains a mirror of the file system metadata. The metadata dump may be referred to as a metadump. The mirror of the file system metadata may be referred to as a metadata mirror. The file system may seek to keep the metadump updated in real time as the metadata changes in the file system. The metadump may be intended to facilitate, for example, accelerated disaster recovery. In the event of a disaster, the metadump can be used to restore metadata in a wholesale manner for the file system it mirrors. Restoring the metadata may include rebuilding the structure(s) in which the metadata was stored and then populating those structure(s). Example methods and apparatus facilitate disaster recovery and the restoration of metadata by providing asynchronous data verification in the cloud, that may trigger a disaster recovery process, or metadata restoration.

Asynchronous verification of data stored in a cloud data storage system includes verifying or scrubbing data independently of other customer or user data processing. For example, methods and apparatus described herein may verify archived data in a cloud storage system according to a schedule, or on an event driven basis, where the schedule or triggering events are independent of user data processing. Upon storing a set of data in a cloud storage system, and associated metadata in a metadata mirror, example methods and apparatus do not require additional information from a user to run. For example, a verification schedule may define that verification procedures are to occur on the 5$^{th}$ of the month. After uploading the archived data and the metadata, example methods and apparatus would not require further input from a user, since everything the data verification process needs (e.g. the data, the checksum and other metadata, the triggering schedule, processing power) is resident in the cloud. For example, transformed data objects and associated checksum and metadata may be sent into a cloud storage system, where the checksum is validated upon receipt by the cloud storage system. Since the data is transformed (e.g. encrypted, compressed, deduplicated) before the checksum is computed, and then stored in the cloud, example methods and apparatus provide secure verification, since the second checksum is computed from the already encrypted archived data.

Example methods and apparatus may also asynchronously or spontaneously notify a user of data integrity failure. In one embodiment, notifying a user of data integrity failure may include using notification facilities provided by a cloud storage system provider to notify a user. In another embodiment, notifying a user of data integrity failure may include emailing a user associated with a set of data using an email address associated with the user. In another embodiment, a uniform resource locater (URL) for a web service for reporting data integrity failures may be employed to notify a user of data integrity failure. In another embodiment, a combination of approaches may be employed. For example, a data integrity failure email could be sent to an email address associated with a user, a text message could be sent to a phone number associated with the user, and proprietary notification facilities provided by the cloud storage system provider could also be used to notify the user. In another embodiment, data integrity failure notifications may be sent to a user once, multiple times, or according to a schedule. In this embodiment, data integrity failure notifications may be sent to a user according to a schedule until the user responds, or until a threshold number of data integrity failure notifications have been sent (e.g., two notifications, ten notifications). In another embodiment, other types of notification, numbers of notifications, or combinations of notifications, may be employed. By asynchronously or spontaneously notifying a user or users about a data integrity failure, example embodiments facilitate saving user time, reducing bandwidth use, and reducing the use of cloud storage system processing resources and thus saving money and increasing the energy efficiency of the cloud storage system, because the user does not have to access the cloud storage system and use cloud storage system resources to discover data integrity failures.

FIG. 1 illustrates an example method 100 for asynchronously verifying data stored in a cloud data storage system. Method 100 includes, at 110, determining that a data verification condition has been met. In one embodiment, the data verification condition may be a data verification scheduled event, a trigger event, a user request, a query, a compliance requirement, or a data security policy. In another embodiment, the data verification condition may be another, different condition. In one embodiment, method 100 performs steps 120 through 160 to 170 on a schedule. For example, method 100 may determine if the data verification condition is met on an hourly basis, on a daily basis, or on a weekly basis. In another embodiment, method 100 may determine if the data verification condition is met on a different schedule. Upon determining that the data verification condition has been met, method 100 proceeds to block 120.

Method 100 includes, at 120, controlling a first access process to access a set of transformed data stored in the cloud data storage system. The first access process is local to the cloud data storage system. The first access process may be a web service, including a cloud-based web service. In one embodiment, the set of transformed data includes encrypted data, deduplicated data, or compressed data. The cloud data storage system is located in a first location. The set of transformed data was transformed by a data storage system located at a second, different location, before the set of transformed data was uploaded to the cloud data storage system. For example, the cloud data storage system may be located in Ohio, while the data storage system may be located in California. A data set may be encrypted, deduplicated, or compressed, by the data storage system or a data center at the location in California, and then provided to the cloud data storage system located in Ohio as the transformed data set. By employing a process local to the cloud data storage system to access the set of transformed data, example methods and apparatus improve on conventional approaches by reducing the amount of bandwidth needed, since the set of transformed data is accessed locally in the cloud, instead of having to be provided back to the data storage system. Accessing the set of transformed data may include retrieving electronic data from a computer memory, receiving a computer file over a computer network, or other computer or electronic based action.

Method 100 also includes, at 130, controlling a second access process to access metadata associated with the set of transformed data. The second access process is a process local to the cloud data storage system. The second access process may be a web service, including a cloud-based web service. In one embodiment, the first access process and the second access process are distinct processes. In another embodiment, the first access process and the second access process are the same process. Accessing metadata associated with the set of transformed data may include retrieving electronic data from a computer memory, receiving a computer file over a computer network, or other computer or electronic based action.

The metadata is stored in the cloud data storage system. In one embodiment, the metadata is stored in a metadata mirror located in the cloud data storage system. In another embodiment, the metadata may be stored in a different location than the transformed data set. The metadata may be stored in a memory associated with the cloud data storage system or a memory associated with the metadata mirror, or the metadata may be stored in a disk drive, solid state device (SSD), shingled magnetic recording (SMR) device, or other non-transitory computer-readable storage device. Some of the metadata for a set of transformed data may be stored in an inode associated with the set of transformed data. The inode may also store association metadata (e.g., parent, child) for the set of transformed data. The association metadata may describe, for example, a parent (e.g., directory) for a file or a descendant (e.g., sub-directory, file) for a directory. The inodes and metadata may be stored in data structures about the files.

The metadata includes a first verification checksum. The first verification checksum is computed by the data storage system at the second location, external to the cloud storage system. The first verification checksum is based on the set of transformed data. The first verification checksum is computed using a cryptographic hash function that takes the set of transformed data as input. In one embodiment, the cryptographic hash function is an MD5 hash function, an SHA-1 hash function, an SHA-256 hash function, or an SHA-512 hash function. In another embodiment, other cryptographic hash functions may be employed. The metadata may include a transaction identifier, atime data, ctime data, mtime data, location data, source data, or other metadata. Location data may include data indicating the location in the cloud data storage system at which the set of transformed data is located.

Method 100 also includes, at 140 computing a second checksum of the set of transformed data accessed from the cloud data storage system. The second checksum is computed using a checksum process that is local to the cloud data storage system. The checksum process may be a web service, including a cloud-based web service. The second checksum is computed using the same cryptographic hash function as used by the data storage system to compute the first verification checksum. Thus, if the first verification checksum was computed using an MD5 hash function, then the second checksum would be computed using the MD5 hash function.

Method 100 also includes, at 150, comparing the first verification checksum with the second checksum. Method 100 compares the first verification checksum with the second checksum using a verification process that is local to the cloud data storage system. The verification process may be a web service, including a cloud-based web service.

Method 100 also includes, at 160, determining if the first verification checksum matches the second checksum based, at least in part, upon the comparison performed by the verification process at 150. In one embodiment, upon determining that the first verification checksum matches the second checksum, method 100 may terminate, enter into a waiting state, provide a notification to the data storage system that the set of transformed data has been verified, generate a verification success log, update the verification success log, or repeat. Upon determining that the first verification checksum does not match the second checksum, method 100 proceeds to block 170.

Method 100 further includes, at 170, generating a data integrity failure report and providing the data integrity failure report to the data storage system. The data integrity failure report may be based, at least in part, on the comparison of the first verification checksum with the second checksum. The data integrity failure report may include the first verification checksum, or the second checksum. The data integrity failure report may also include a time or date indicating when the data integrity failure report was generated, location data associated with the set of transformed data, atime data associated with the set of transformed data, or other metadata associated with the set of transformed data. Providing the data integrity failure report to the data storage system may include retrieving electronic data from a computer memory, receiving or transmitting a computer file over a computer network, or other computer or electronic based action.

In one embodiment, method 100 may further include providing, to a user associated with the set of transformed data stored, a notification of the data integrity failure. Providing a notification of the data integrity failure may include asynchronously or spontaneously notifying the user of data integrity failure. Notifying the user of data integrity failure may include using notification facilities provided by a cloud storage system provider to notify the user. Notifying the user may include emailing the user associated with a set of data using an email address associated with the user, or sending a text message (e.g. short message service (SMS) message) to a phone number associated with the user. A uniform resource locater (URL) for a web service for reporting data integrity failures may be employed to notify a user of data integrity failure. In another embodiment, a combination of approaches may be employed. In another embodiment, data integrity failure notifications may be sent to a user once, multiple times, or according to a schedule. In another embodiment, data integrity failure notifications may be sent to a user according to a schedule, until the user responds, or until a threshold number of data integrity failure notifications have been sent (e.g., two notifications, ten notifications). The schedule, the threshold number, or the mode of notification may be predefined, may be user defined, or may be dynamically adjusted based on user response to data integrity notifications.

Like numbers refer to like or similar elements throughout the description of the figures. When an element is referred to as being "connected" to another element, it can be directly connected to the other element or intervening elements may be present. In contrast, when an element is referred to as being "directly connected" to another element, there are no intervening elements present. Other words used to describe the relationship between elements should be interpreted in a like fashion (e.g., "between" versus "directly between," "adjacent" versus "directly adjacent," etc.)

Figure 2:
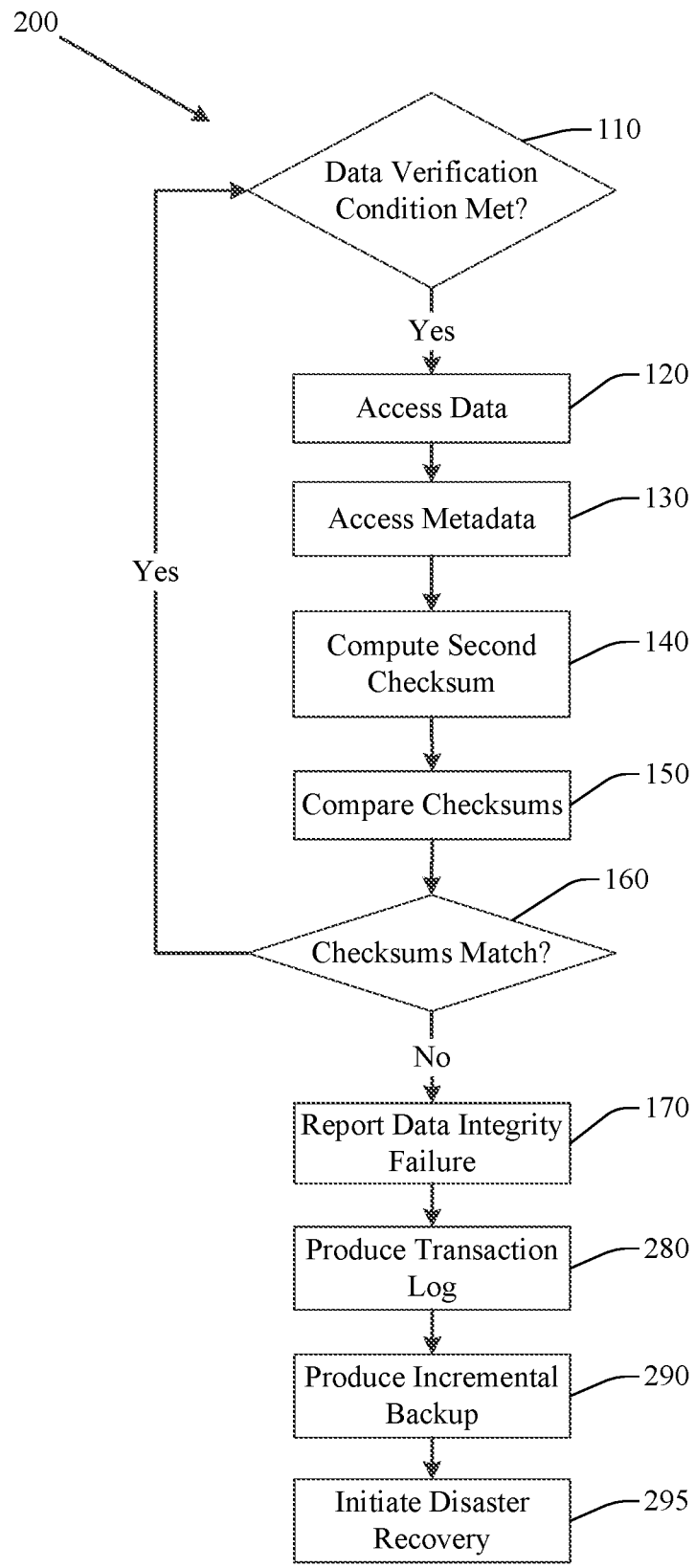
FIG. 2 illustrates an example method associated with asynchronous in-situ data verification for the cloud.

FIG. 2 illustrates an example method 200 for asynchronously verifying data stored in a cloud data storage system. Method 200 is similar to method 100 but includes additional steps 280, 290, and 295. Upon determining that the first verification checksum does not match the second checksum at 160, method 200 proceeds to block 170.

Method 200 includes, at 170, generating a data integrity failure report and providing the data integrity failure report to the data storage system. The data integrity failure report may be based, at least in part, on the comparison of the first verification checksum with the second checksum. In one embodiment, providing, to a user associated with the set of transformed data stored, a notification of the data integrity failure, includes providing the data integrity failure report.

Method 200 further includes, at 280, producing a log of transactions associated with the set of transformed data. Membership in the log of transactions is based on a transaction identifier stored in the metadata mirror. In one embodiment, membership in the transaction log may be based on other metadata stored in the metadata mirror. In one embodiment, method 200 also includes, at 280, providing the log of transactions to the data storage system.

Method 200 also includes, at 290, producing an incremental backup of the set of transformed data. Membership in the incremental backup is based, at least in part, on transaction identifiers stored in the log of transactions. In one embodiment, method 200 also includes, at 290, providing the incremental backup to the data storage system.

Method 200 further includes, at 295, initiating a disaster recovery procedure for the data storage system or for the cloud storage system. In one embodiment, the disaster recovery procedure includes destroying the set of transformed data. In another embodiment, the disaster recovery procedure includes other, different actions, including quarantining the set of transformed data, restoring the set of transformed data to an earlier state, or other action. In one embodiment, the disaster recovery procedure may include determining if the set of transformed data is not in a legal hold or immutability interval. Upon determining that the set of transformed data is not in a legal hold or immutability interval, method 200 may destroy or quarantine the set of transformed data. The disaster recovery procedure may be based on a data security policy, or may be user controlled. In one embodiment, initiating a disaster recovery procedure for the data storage system includes notifying a user associated with the set of transformed data of the initiation of the disaster recovery procedure.

Figure 3:
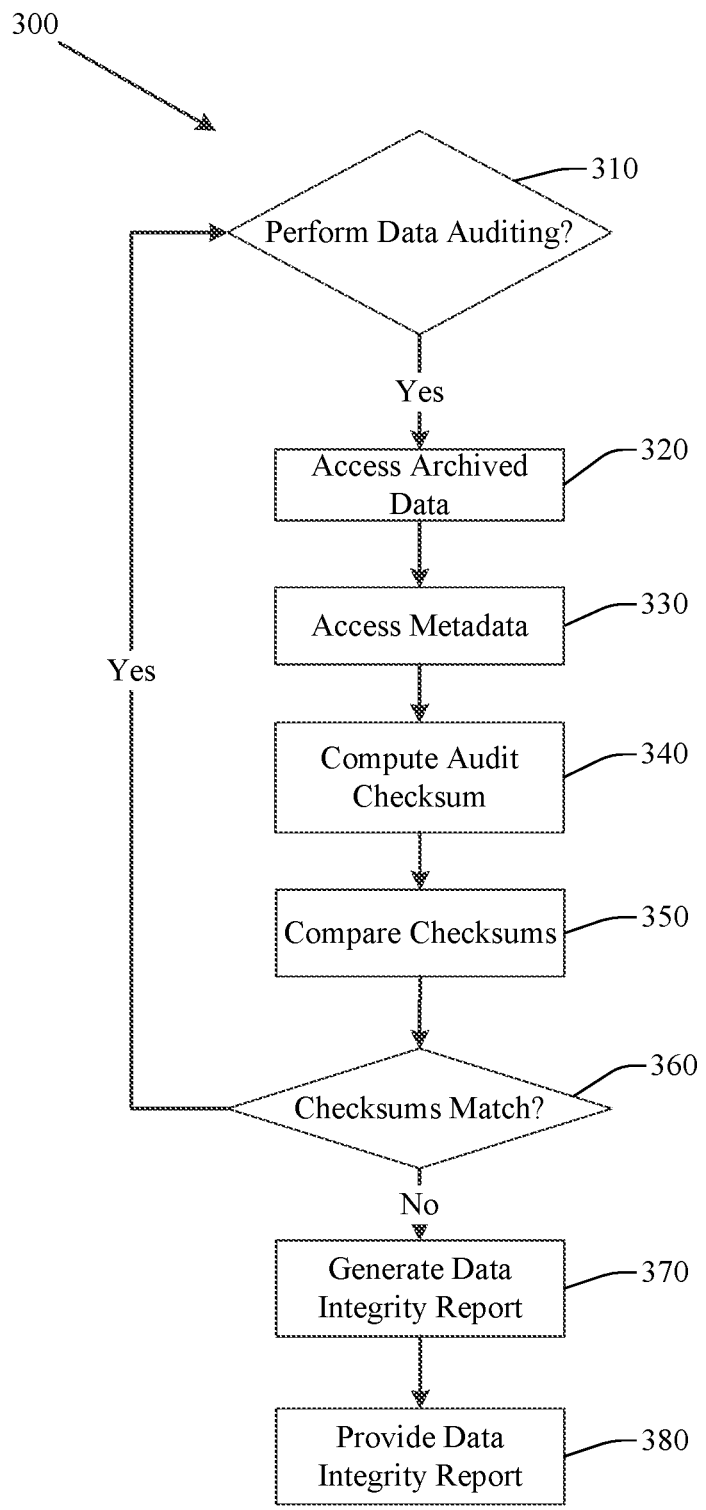
FIG. 3 illustrates an example method associated with asynchronous in-situ data verification for the cloud.

FIG. 3 illustrates an example method 300 for asynchronously auditing archived data. Method 300 includes, at 310, determining if a data auditing condition has been met. The data auditing condition may be a data auditing scheduled event, a trigger event, a user request, a compliance requirement, an ad hoc query, or a data security policy. Upon determining that the data auditing condition has not been met, method 300 may enter into a wait mode, terminate, or repeat. Upon determining that the data auditing condition has been met, method 300 proceeds to block 320.

Method 300 includes, at 320, accessing archived data stored in a cloud storage system. Method 300 accesses the archived data set using a process or web service local to the cloud storage system. The archived data includes an encrypted data set, a compressed data set, or a deduplicated data set. The archived data is encrypted, compressed, or deduplicated by a data storage system distinct from the cloud storage system before being stored in the cloud storage system.

Method 300 also includes, at 330, accessing a set of metadata associated with the archived data set. Method 300 accesses the set of metadata using a process or web service local to the cloud storage system. The metadata is stored in a metadata mirror. The metadata mirror may be part of the cloud storage system, or may be a separate system. The metadata includes a data integrity checksum. The data integrity checksum is computed using a cryptographic hash function. The metadata may also include a transaction identifier, atime data, ctime data, mtime data, location data, source data, or other metadata.

Method 300 also includes, at 340, computing an audit checksum based, at least in part, on the archived data set. Method 300 computes the audit checksum using a process or web service local to the cloud storage system. The web service may be an on-demand web service. In one embodiment, the web service is a software as a service accessed by a thin client. The audit checksum is computed using the same cryptographic hash function as used to compute the data integrity checksum. The cryptographic hash function may be an MD5 hash function, an SHA-1 hash function, and SHA-256 hash function, and SHA-512 hash function, or other hash function.

Method 300 also includes, at 350, comparing the audit checksum with the data integrity checksum. Method 300 compares the audit checksum with the data integrity checksum using a process or web service local to the cloud storage system. The web service may be an on-demand web service, or a software as a service.

Method 300 also includes, at 360, determining if the audit checksum matches the data integrity checksum. If the audit checksum and the data integrity checksum match, method 300 returns to block 310. In one embodiment, if the audit checksum and the data integrity checksum match, method 300 may generate a verification success log, update a verification success log, terminate, or repeat. If the audit checksum and the data integrity checksum do not match, method 300 proceeds to block 370.

Method 300 includes, at 370, generating a data audit report. The data audit report may include the audit checksum, the data integrity checksum, or results of the comparison of the audit checksum with the data integrity checksum. In one embodiment, the data audit report may contain other information associated with the archived data, including a transaction identifier, or atime data. Method 300 further includes, at 380, providing the data audit report to the data storage system that is distinct from the cloud storage system. In one embodiment, generating the data audit report further includes producing a log of transactions associated with the archived data, or producing an incremental backup of the archived data. In another embodiment, method 300 may further include notifying a user associated with the archived data that the audit checksum and the data integrity checksum do not match.

Figure 4:
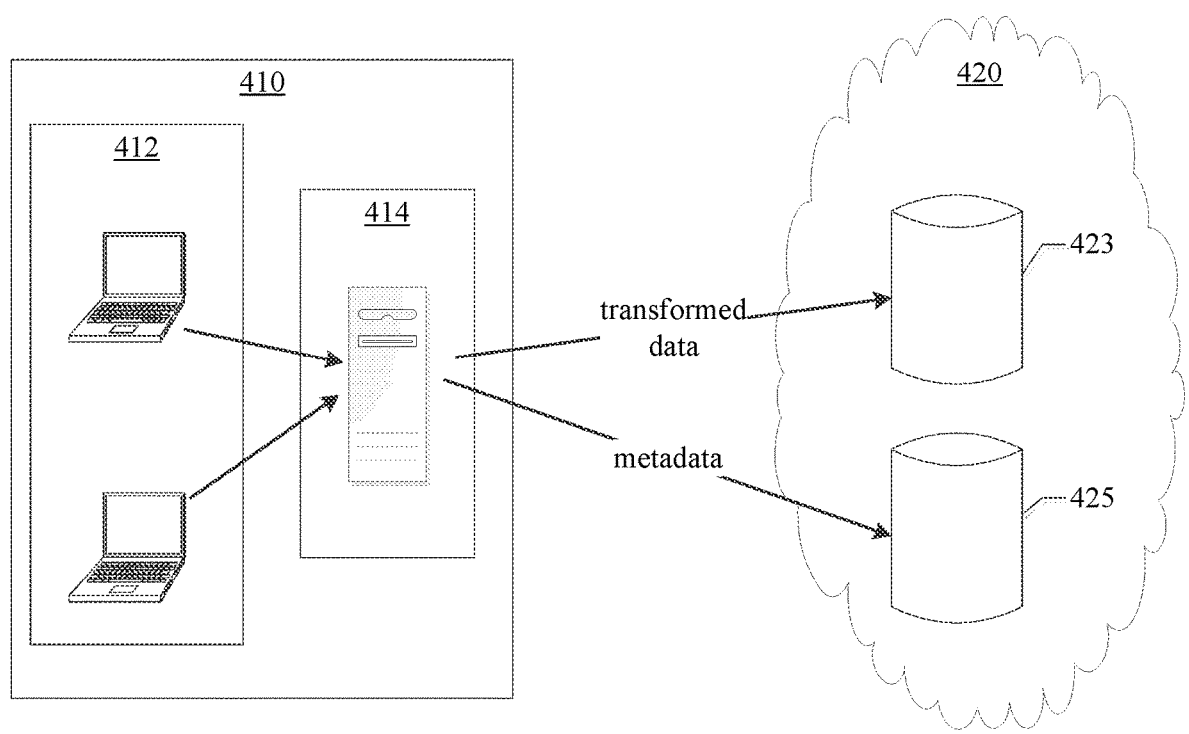
FIG. 4 illustrates an example environment in which example methods and apparatus may be implemented.

FIG. 4 illustrates an example environment 400 in which example methods and apparatus described herein may be implemented. Environment 400 includes a data storage system 410 located in a first location. Data storage system 410 includes primary data 412. Primary data 412 may include files, binary large objects (BLOBs) or other forms of electronic data. Primary data 412 may be stored or backed up to data center 414.

Data center 414 may be, for example, an enterprise deduplication appliance, an on-premise virtual data center, or a physical data center. Data center 414 may generate a set of transformed data or archived data by encrypting primary data 412, compressing primary data 412, or deduplicating primary data 412. Data center 414 may transform primary data 412 using other functions or transforms. Data center 414 may compute a verification checksum of the transformed data or archived data using a cryptographic hash function. Data center 414 may provide the transformed data or archived data to cloud storage system 423. Data center 414 generates metadata associated with the transformed data, and includes the verification checksum with the metadata.

Example environment 400 further illustrates a cloud computing environment 420. Cloud computing environment 420 includes a cloud storage system 423 and a metadata mirror 425. Example methods and apparatus may store the transformed data or archived data to cloud storage system 423. Metadata associated with the transformed data or archived data stored in cloud storage system 423 may be stored in metadata mirror 425.

In a conventional approach to archived data verification, encrypted, compressed, or deduplicated data stored in cloud storage system may have to be transmitted back to data center 414 to be decrypted, decompressed, or otherwise transformed back to its earlier pre-transform state, in order to compute a checksum to compare with the original data verification checksum. A user may have already paid for transmitting the data to the cloud storage system, so transmitting the data back to the data center 414 further increases bandwidth usage, time spent transmitting data, and consequently costs. Additionally, it is desirable to asynchronously verify the integrity of data stored in the cloud storage system, since the data storage system 410 or data center 414 may have worse reliability or more frequent down-time than the cloud storage system 423. Example methods and apparatus improve on conventional approaches by performing data verification tasks in-situ in the cloud using processes local to the cloud, rather than re-transmitting the archived data back to the data center 414. Example methods and apparatus further improve on conventional approaches by using web services or on-demand web services to perform data verification tasks in-situ in the cloud, and thus not requiring proprietary hardware, systems, or software that matches proprietary hardware, systems, or software at the data center 414. Additionally, example methods and apparatus improve on the security of conventional approaches, since the transformed or archived data is stored in encrypted form, and because the verification checksum is computed at the data center 414 from the encrypted data. Since the verification checksum is computed at the data center 414 using the transformed data, data stored in the cloud storage system is not exposed to risky decryption in the cloud. Example methods and apparatus further improve on conventional approaches by asynchronously and spontaneously informing a user associated with the transformed or archived data of a data integrity failure.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

In one embodiment, accessing archived data, accessing metadata, computing a checksum, comparing checksums, detecting events, and generating a data verification report operate at least partially in parallel to asynchronously verify data stored in the cloud. Operating at least partially in parallel while allowing data storage system to remain active improves the efficiency of the computer running data storage system and the computer or computers running the cloud storage system since the applications can run continuously without having to be brought up and down. Efficiency is also improved because the approach described herein does not need to transmit archived data back to the originating data storage system.

In one example, a method may be implemented as computer executable instructions. Thus, in one example, a computer-readable storage device may store computer executable instructions that if executed by a machine (e.g., processor) cause the machine to perform method 100, method 200, or method 300. While executable instructions associated with method 100, method 200, or method 300 are described as being stored on a computer-readable storage device, it is to be appreciated that executable instructions associated with other example methods described herein may also be stored on a computer-readable medium.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium" or "computer-readable storage device" as used herein, refers to a non-transitory medium that stores instructions and/or data. "Computer-readable storage medium" or "computer-readable storage device" does not refer to propagated signals, per se. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium or computer-readable storage device may include, but are not limited to, a floppy disk, a flexible disk, a hard disk, a magnetic tape, a solid state device (SSD) a shingled magnetic recording (SMR) device, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Circuit", as used herein, includes but is not limited to hardware, firmware, software in execution on a machine, and/or combinations of each to perform a function(s) or an action(s), and/or to cause a function or action from another logic, method, and/or system. A circuit may include, for example, a software controlled microprocessor, a discrete logic (e.g., ASIC), an analog circuit, a digital circuit, a programmed logic device, or a memory device containing instructions. A circuit may include one or more gates, combinations of gates, or other circuit components. Where multiple circuits are described, it may be possible to incorporate the multiple circuits into one circuit. Similarly, where a single circuit is described, it may be possible to distribute that single circuit between multiple circuits.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 5:
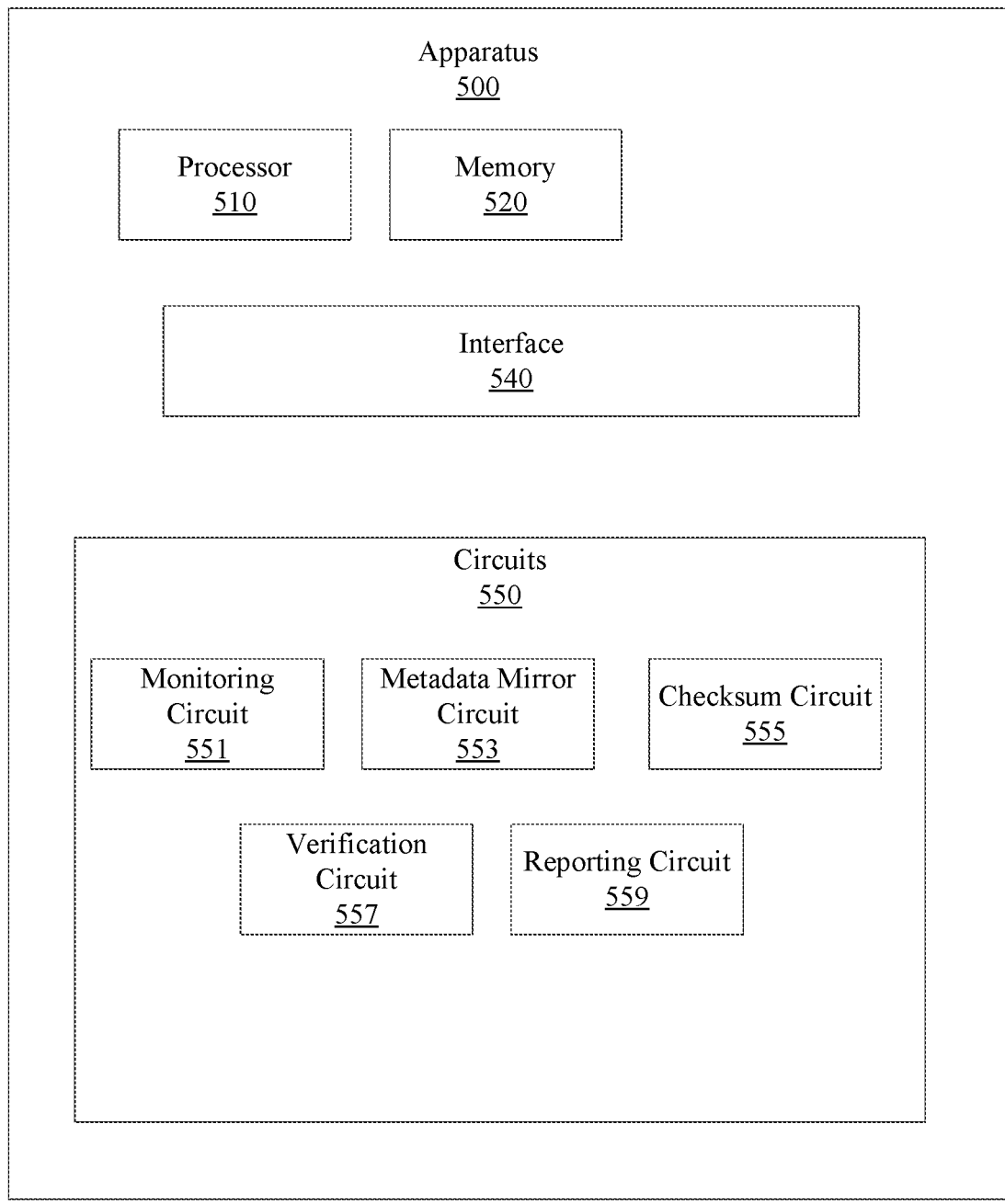
FIG. 5 illustrates an example apparatus associated with asynchronous in-situ data verification for the cloud.

FIG. 5 illustrates an apparatus 500 that includes a processor 510, a memory 520, and a set 550 of circuits that is connected to the processor 510 and memory 520 by an interface 540. The memory 520 may store metadata associated with transformed data stored in a cloud storage system. In one embodiment, processor 510 and the set of circuits 550 facilitate asynchronous in-situ data verification for data stored in the cloud.

The set 550 of circuits includes a monitoring circuit 551 that determines if a data auditing condition has been met. The data auditing condition is associated with a cloud storage system or archived data stored in the cloud storage system. The data auditing condition may be a scheduled event, a user request, a time interval, a time, a date, a data protection policy, a compliance requirement, or a trigger event. The archived data includes encrypted data, compressed data, or deduplicated data. The archived data was encrypted, compressed, or deduplicated by a data storage system that is distinct from the cloud storage system. The data storage system is located a threshold distance from the cloud storage system. For example, the data storage system may be located 1 km, 100 km, or 1000 km away from the cloud storage system. In another embodiment, the data storage system is located a different distance from the cloud storage system. The data storage system may be, for example, an enterprise deduplication appliance, an on-premise virtual data center, or a physical data center.

The apparatus 500 also includes a metadata mirror circuit 553. Metadata mirror circuit 553 controls a metadata mirror to provide metadata associated with the archived data to the apparatus. The metadata includes a first checksum computed from the archived data. The first checksum is computed by the data storage system. In one embodiment, the first checksum is computed using a cryptographic hash function. The cryptographic hash function may be an MD5 hash function, an SHA-1 hash function, and SHA-256 hash function, or an SHA-512 hash function. In another embodiment, the cryptographic hash function may be another, different cryptographic hash function.

Apparatus 500 also includes a checksum circuit 555. Checksum circuit 555 computes a second checksum based on the archived data. Checksum circuit 555 computes the second checksum using the same cryptographic hash function as was used by the data storage system. For example, checksum circuit 555 may compute the second checksum using an MD5 hash function, an SHA-1 hash function, and SHA-256 hash function, or an SHA-512 hash function.

Apparatus 500 also includes a verification circuit 557. Verification circuit 557 generates an audit of the first checksum and the second checksum by comparing the second checksum with the first checksum. A comparison of the first checksum with the second checksum that indicates that the first checksum and the second checksum have different values, may indicate a data integrity failure of the archived data. In one embodiment, the verification circuit 557, upon detecting a difference between the first checksum and the second checksum, inspects the archived data and detects file transactions that change data in the archived data. In this embodiment, verification circuit 557 may then produce a batch of transactions based on the detected file transactions, and provide the batch of transactions to the reporting circuit 559.

Apparatus 500 also includes a reporting circuit 559. Reporting circuit 559 generates a report of the audit generated by verification circuit 557. Reporting circuit 559 provides the report to the data storage system. Providing the report to the data storage system may include retrieving electronic data from a computer memory, receiving or transmitting a computer file over a computer network, or other computer or electronic based action. In one embodiment, reporting circuit 559 generates the report of the audit based, at least in part, on the batch of transactions provided by verification circuit 557. In one embodiment, reporting circuit 559 generates a capacity planning report. The capacity planning report is based, at least in part, on the batch of transactions, the audit of the first checksum, or the second checksum. Reporting circuit 557 provides the capacity planning report to the data storage system. In one embodiment, reporting circuit 559 notifies a user associated with the cloud storage system or the archived data stored in the cloud storage system of a data integrity failure. Notifying the user may include emailing the user a notification of data integrity failure, sending a text message to the user, employing notification facilities included in the cloud storage system to notify the user, employing a URL for a web service for reporting data integrity failures to the user, or other approach to notifying the user. Reporting circuit 559 may employ a combination of different approaches to notify a user. Using a combination of different approaches to notify a user may offer increased reliability compared to conventional approaches, or compared to using just one more of notification. For example, reporting circuit 559 may send an email notification to the user, and a text message. Reporting circuit 559 may notify the user according to a schedule, according to a threshold period of time, or a may notify the user a number of times.

Figure 6:
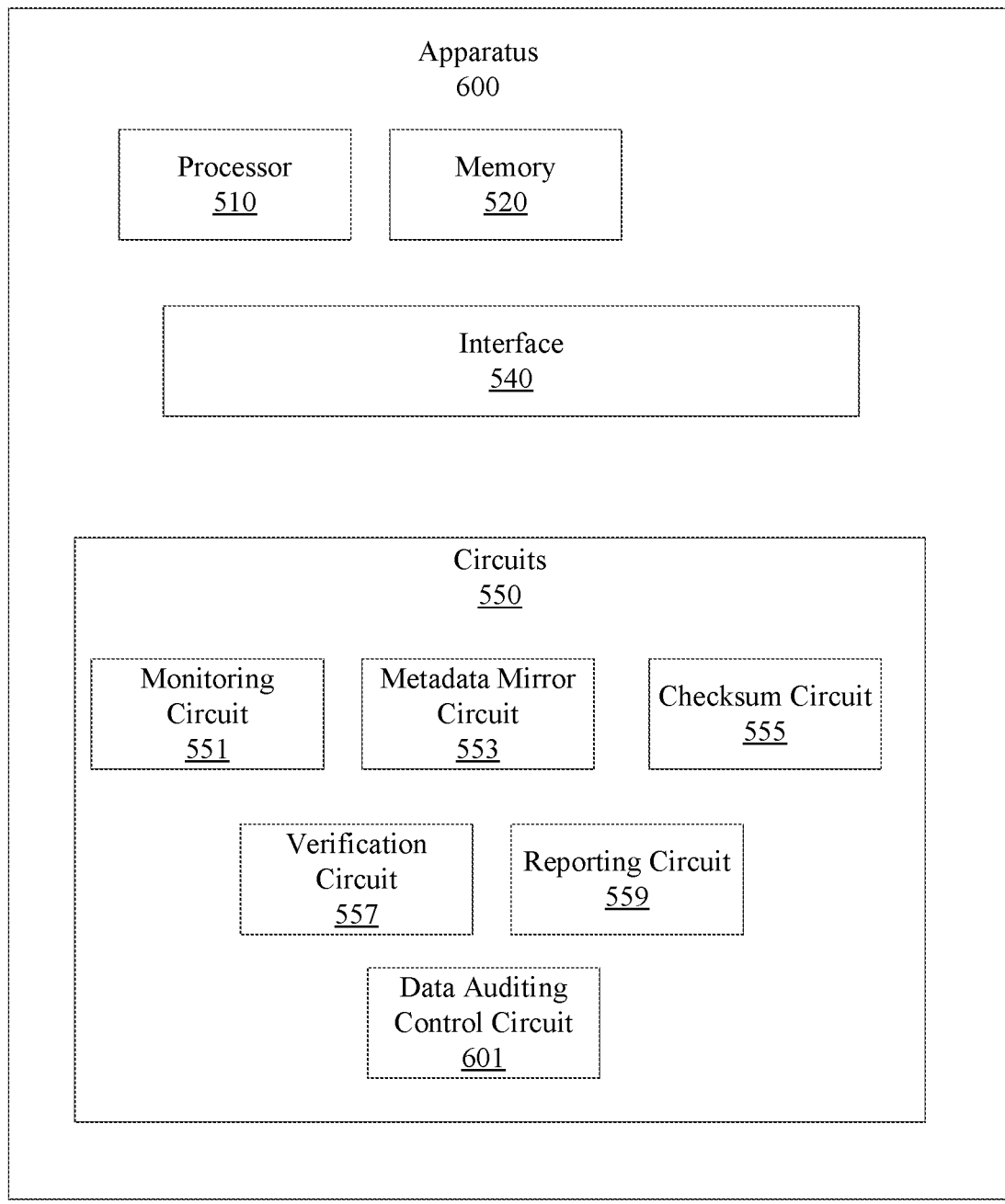
FIG. 6 illustrates an example apparatus associated with asynchronous in-situ data verification for the cloud.

FIG. 6 illustrate an example apparatus 600 for asynchronous validation of data stored in a cloud data storage system. Apparatus 600 is similar to apparatus 500, but includes additional elements. Apparatus 600 includes a data auditing control circuit 601. The data auditing control circuit 601 provides an application programming interface (API) that accepts an ad hoc query. The ad hoc query may seek information on one or more features of the archived data or metadata. The ad hoc query may be accepted independently of, for example, a data security policy, a data auditing schedule, or other pre-planned event or condition. For example, a user may request a one-time, unscheduled audit of the archived data based on an unanticipated change to a compliance requirement or other unscheduled event. Thus, the API accepts queries that were not predefined. The data auditing control circuit 601 may control the metadata mirror circuit 553, based on the ad hoc query, to control the metadata mirror to provide the metadata to the apparatus. The data auditing control circuit 601 may control the checksum circuit 855, based on the ad hoc query, to compute the second checksum based on the archived data. The data auditing control circuit 601 may control the verification circuit 857 to generate the audit of the first checksum and the second checksum, based on the ad hoc query.

To improve efficiency over conventional systems, the monitoring circuit 551 and metadata mirror circuit 553 operate at least partially in parallel. For example, monitoring circuit 551 may determine if a data auditing condition associated with a cloud storage system has been met, and the metadata mirror circuit 553 may control a metadata mirror to provide metadata associated with archived data to the apparatus 500 or 600. To further improve efficiency, monitoring circuit 551 and metadata mirror circuit 553 may operate while a disaster recovery procedure is in process.

Figure 7:
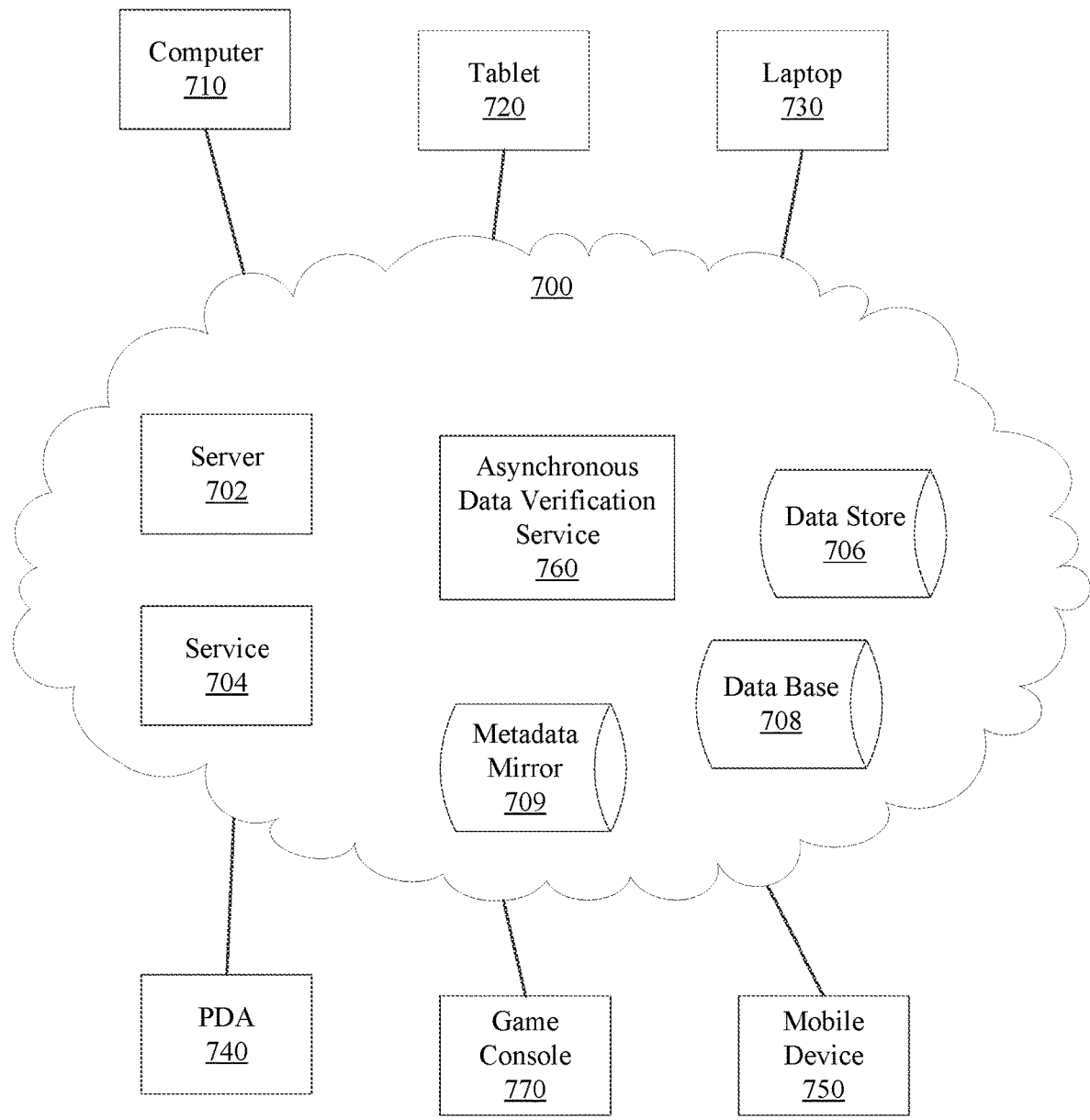
FIG. 7 illustrates an example cloud-based service associated with asynchronous in-situ data verification.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example asynchronous data verification service 760 residing in the cloud. The asynchronous data verification service 760 may rely on a server 702 or service 704 to perform processing and may rely on a data store 706 or database 708 to store data, and on metadata mirror 709 to store metadata. While a single server 702, a single service 704, a single data store 706, a single database 708, and a single metadata mirror 709 are illustrated, multiple instances of servers, services, data stores, metadata mirrors, and databases may reside in the cloud and may, therefore, be used by the asynchronous data verification service 760.

FIG. 7 illustrates various devices accessing the asynchronous data verification service 760 in the cloud. The devices include a computer (e.g., a data storage system, an enterprise deduplication appliance) 710, a tablet 720, a laptop computer 730, a personal digital assistant 740, a mobile device (e.g., cellular phone, satellite phone, wearable computing device) 750, and a game console 770. The asynchronous data verification service 760 may control a computer to access a set of transformed data or archived data, to access metadata associated with the set of transformed data or archived data, to compute a checksum, to compare checksums, and to intelligently and asynchronously verify the data integrity of the set of transformed data or archived data in-situ.

It is possible that different users at different locations using different devices may access the asynchronous data verification service 760 through different networks or interfaces. In one example, the asynchronous data verification service 760 may be accessed by a mobile device 750 submitting an ad hoc query to asynchronous data verification service 760. In another example, portions of service 760 may reside on a mobile device 750.

While example methods, apparatus, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable storage device storing computer-executable instructions that when executed by a computer cause the computer to perform a method for asynchronously validating data stored in a cloud data storage system, the method comprising:
    upon determining that a data verification condition has been met:
        controlling a first access process local to the cloud data storage system to access a set of transformed data stored in the cloud data storage system, where the cloud data storage system is located in a first location, and where the set of transformed data was transformed by a data storage system located at a second, different location;
        controlling a second access process local to the cloud data storage system to access metadata associated with the set of transformed data, where the metadata is stored in the cloud data storage system, where the metadata is stored in a metadata mirror, where the metadata comprises a first verification checksum, where the first verification checksum was computed by the data storage system at the second location based, at least in part, on the transformed set of data, where the metadata further comprises a transaction identifier, atime data, ctime data, mtime data, or location data;
        computing, using a checksum process local to the cloud data storage system, a second checksum of the set of transformed data; and
        comparing, using a verification process local to the cloud data storage system, the first verification checksum with the second checksum;
    upon determining that the first verification checksum and the second checksum do not match:
        generating a data integrity failure report;
        providing the data integrity failure report to the data storage system;
        providing, to a user associated with the set of transformed data stored, a notification of the data integrity failure;
        producing a log of transactions associated with the set of transformed data, where membership in the log is based, at least in part, on a transaction identifier stored in the metadata mirror, where the data integrity failure report comprises the first verification checksum, the second checksum, an atime value, or the log of transactions, and where the notification of the data integrity failure includes the data integrity failure report; and
        producing an incremental backup of the set of transformed data, where membership in the incremental backup is based, at least in part, on transaction identifiers stored in the log of transactions.

2. The non-transitory computer-readable storage device of claim 1, where the set of transformed data is encrypted data, deduplicated data, or compressed data.

3. The non-transitory computer-readable storage device of claim 1, where the first verification checksum or the second checksum is computed using a cryptographic hash function.

4. The non-transitory computer-readable storage device of claim 3, where the cryptographic hash function is an MD5 hash function, an SHA-1 hash function, a SHA-256 hash function, or a SHA-512 hash function.

5. The non-transitory computer-readable storage device of claim 1, where the data verification condition comprises a data verification scheduled event, a trigger event, a user request, a compliance requirement, or a data security policy.

6. The non-transitory computer-readable storage device of claim 1, where the metadata is stored in the same location as the set of transformed data.

7. The non-transitory computer-readable storage device of claim 1, where the first access process, the second access process, the checksum process, or the verification process are web services.

8. The non-transitory computer-readable storage device of claim 1, the method further comprising, upon detecting that the first verification checksum and the second checksum do not match, initiating a disaster recovery procedure for the data storage system, where the disaster recovery procedure comprises destroying the set of transformed data.

9. An apparatus, comprising:
    a processor;
    a memory;
    a set of circuits; and
    an interface that connects the processor, the memory, and the set of circuits;
    the set of circuits comprising:
        a monitoring circuit that determines if a data auditing condition associated with a cloud storage system or archived data stored in the cloud storage system has been met, where the archived data comprises encrypted data, compressed data, or deduplicated data, where the archived data was encrypted, compressed, or deduplicated by a data storage system that is distinct from the cloud storage system, where the data storage system is located a threshold distance from the cloud storage system;
        a metadata mirror circuit that controls a metadata mirror to provide metadata associated with the archived data to the apparatus, where the metadata includes a first checksum computed from the archived data, where the first checksum is computed by the data storage system;
        a checksum circuit that computes a second checksum based on the archived data;
        a verification circuit that generates an audit of the first checksum and the second checksum by comparing the second checksum with the first checksum, where the verification circuit, upon detecting a difference between the first checksum and the second checksum:
inspects the archived data and detects file transactions that change data in the archived data, produces a batch of transactions, provides the batch of transactions to the reporting circuit; and
a reporting circuit that generates a log of the audit, and that provides the log to the data storage system, where the reporting circuit generates a capacity planning report based, at least in part, on the batch of transactions, the audit of the first checksum, or the second checksum, where the reporting circuit provides the capacity planning report to the data storage system, and where the reporting circuit notifies a user associated with the cloud storage system or the archived data stored in the cloud storage system of a data integrity failure.

10. The apparatus of claim 9, where the data auditing condition comprises a scheduled event, a user request, a time interval, a time, a date, a data protection policy, or a trigger event.

11. The apparatus of claim 9, where the first checksum is computed using a cryptographic hash function, and where the checksum circuit computes the second checksum using the cryptographic hash function, where the cryptographic hash function is an MD5 hash function, a SHA-1 hash function, an SHA-256 hash function, or an SHA-512 hash function.

12. The apparatus of claim 9, comprising:
a data auditing control circuit that provides an application programming interface that accepts an ad hoc query, where the ad hoc query seeks information on one or more features of the archived data or the metadata, or where the ad hoc query:
controls the metadata mirror circuit to control the metadata mirror to provide the metadata to the apparatus;
controls the checksum circuit to compute the second checksum based on the archived data; or
controls the verification circuit to generate the audit of the first checksum and the second checksum.

13. A method for asynchronously auditing archived data, the method comprising:
upon determining that a data auditing condition has been met:
accessing an archived data set stored in a cloud storage system, where the archived data set is an encrypted data set, a compressed data set, or a deduplicated data set;
accessing a set of metadata associated with the archived data set, where the set of metadata is stored in a metadata mirror, where the set of metadata includes a data integrity checksum, where the set of metadata also includes a transaction identifier, atime data, ctime data, mtime data, or location data;
computing, using an on-demand web service local to the cloud storage system, an audit checksum based, at least in part, on the archived data set;
comparing, using an on-demand web service local to the cloud storage system, the audit checksum with the data integrity checksum;
upon determining that the audit checksum does not match the data integrity checksum:
generating a data audit report;
providing the data audit report to a data storage system that is distinct from the cloud storage system;
providing a data integrity failure notification to a user associated with the archived data set;
producing a log of transactions associated with the archived data set, where membership in the log is based, at least in part, on a transaction identifier stored in the metadata mirror, where the data audit report comprises the audit checksum, the data integrity checksum, an atime value, or the log of transactions, and where the data integrity failure notification includes the data audit report; and
producing an incremental backup of the archived data set, where membership in the incremental backup is based, at least in part, on transaction identifiers stored in the log of transactions.

* * * * *